United States Patent [19]
Eaton et al.

[11] Patent Number: 5,920,576
[45] Date of Patent: *Jul. 6, 1999

[54] METHOD AND APPARATUS FOR PROVIDING REMINDER MESSAGES IN A COMMUNICATION SYSTEM

[75] Inventors: Eric Thomas Eaton, Lake Worth; Von Alan Mock, Boynton Beach, both of Fla.

[73] Assignee: Motorola, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/409,237

[22] Filed: Mar. 24, 1995

[51] Int. Cl.⁶ .................................................. H04L 1/18
[52] U.S. Cl. ............................................. 371/33; 371/32
[58] Field of Search ................... 371/32, 33; 379/38–43; 340/825.44, 825.46, 825.55, 825.47, 825.54, 825.5, 825.52

[56] References Cited

U.S. PATENT DOCUMENTS

| | | | |
|---|---|---|---|
| 4,549,297 | 10/1985 | Nishimoto | 371/33 |
| 4,701,759 | 10/1987 | Nadir et al. | 340/825.44 |
| 4,872,005 | 10/1989 | DeLuca et al. | 340/825.44 |
| 5,128,979 | 7/1992 | Reich et al. | 379/40 |
| 5,185,604 | 2/1993 | Nepple et al. | 340/825.44 |
| 5,249,220 | 9/1993 | Moskowitz et al. | 379/93 |
| 5,297,143 | 3/1994 | Fridrich et al. | 371/32 |

Primary Examiner—Emmanuel L. Moise
Attorney, Agent, or Firm—Charles W. Bethards

[57] ABSTRACT

A communication system (100) includes a terminal (105) that receives messages for transmission to a transceiver (110). A method for transmitting reminders within the communication system (100) comprises the steps of transmitting a message to the transceiver (110), determining that information relating to the message has not been received from the transceiver (110) after a predetermined time, and sending a reminder associated with the message to the transceiver (110) after the predetermined time.

17 Claims, 10 Drawing Sheets

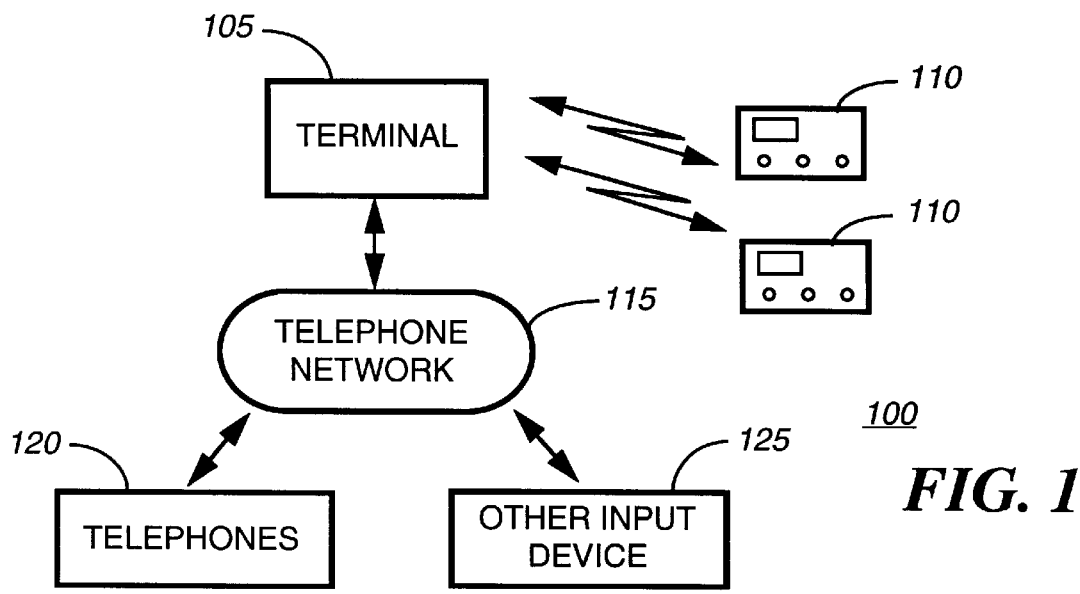
FIG. 1
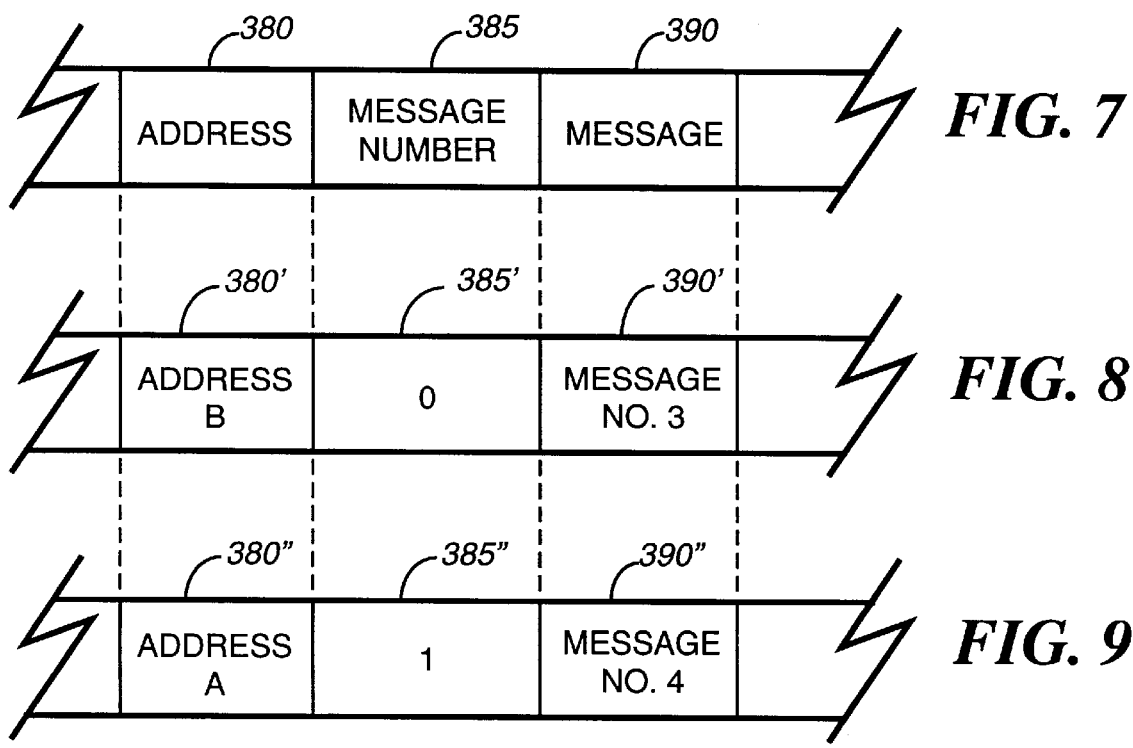
FIG. 7
FIG. 8
FIG. 9

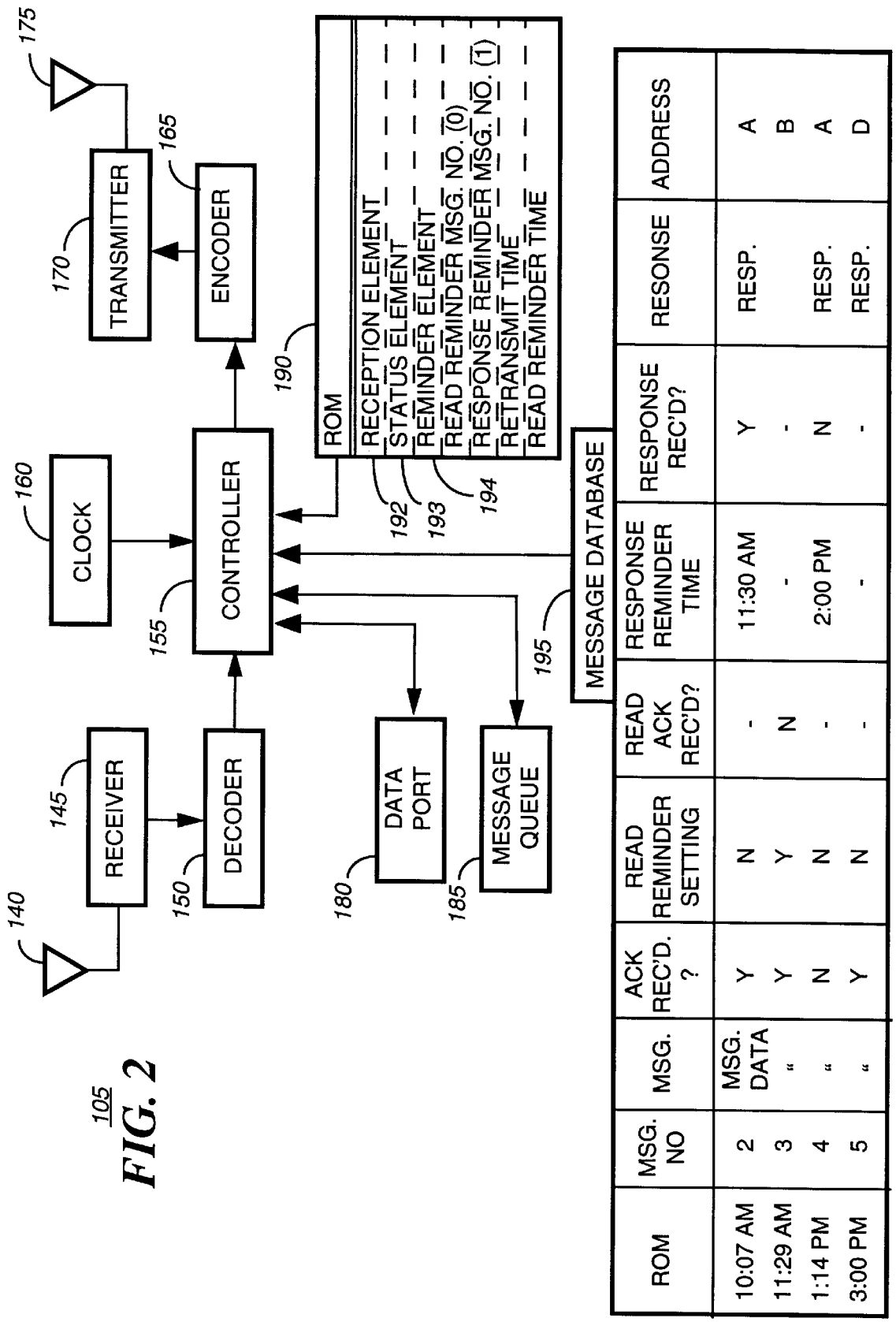

METHOD AND APPARATUS FOR PROVIDING REMINDER MESSAGES IN A COMMUNICATION SYSTEM

FIELD OF INVENTION

This invention relates in general to messaging within a communication system and more specifically to a method and apparatus for providing reminder messages in a communication system.

BACKGROUND OF THE INVENTION

Conventionally, acknowledge back communication systems include a terminal for transmitting messages. Portable units receive the messages and acknowledge message reception by sending acknowledgment signals (ACKs) back to the terminal. Therefore, the terminal can determine whether or not a transmitted message was actually received by a portable unit.

Recently, communication systems have been developed in which a portable unit additionally transmits a "read" acknowledgment signal (READ ACK) to the terminal in response to presentation of a received message to a user. The message originator can then be informed when the user has read the message.

When the user postpones reading or responding to a received message for an indefinite period of time, the originator can discover that the user has not yet read the message because a READ ACK will not have been received by the terminal. However, the only ways to notify the user that he should read the message are by transmitting another duplicate message or by tracking the user down through alternative means, such as by telephone or electronic mail. These methods, even if effective, waste time during which the originator must provide duplicate information to the terminal, call the user, or transmit an electronic mail message to the user. Retransmission of the message could also result in inefficient use of the system. For instance, if the message is an information message of substantial length, sending the message again wastes system capacity and result in longer latency for other user messages being delivered by the system.

Thus, what is needed is a method and apparatus for reminding the user of unread messages or of messages that are awaiting a response.

SUMMARY OF THE INVENTION

According to a first aspect of the present invention, a terminal for transmitting reminder messages includes a transmitter for transmitting a message, a receiver for receiving information relating to the message, and a reminder element coupled to the transmitter and the receiver for generating a reminder associated with the message when the information has not been received after a predetermined time. The reminder is transmitted by the transmitter. The terminal also includes a data port for receiving a message and an indication that the reminder is to be transmitted when the information has not been received after the predetermined time.

According to a second aspect of the present invention, a communication system in which reminders are transmitted comprises a transceiver for receiving and presenting a message to a user. The transceiver includes a transmitter for transmitting an acknowledgment when the message has been presented. The communication system further includes a terminal for transmitting the message and a reminder element for transmitting a read reminder to the transceiver when the acknowledgment has not been received after a predetermined time. The transceiver also includes a display for presenting a predetermined read reminder message, responsive to reception of the read reminder, to remind the user to read the message.

According to a third aspect of the present invention, a communication system in which reminders are transmitted includes a transceiver for receiving and presenting a message to a user. The transceiver comprises inputting circuitry for inputting a response to the message by the user and a transmitter for transmitting the response. The communication system further includes a terminal for transmitting the message. The terminal includes a reminder element for transmitting a response reminder to the transceiver when the response has not been received after a predetermined time. The transceiver has a display for presenting a predetermined response reminder message responsive to reception of the response reminder to remind the user to respond to the message.

According to a fourth aspect of the present invention, a communication system includes a terminal that receives messages for transmission to a transceiver. A method for transmitting reminders within the communication system comprises the steps of transmitting a message to the transceiver, determining that information relating to the message has not been received from the transceiver after a predetermined time, and sending a reminder associated with the message to the transceiver after the predetermined time.

BRIEF DESCRIPTION OF THE DRAWINGS

FIG. 1 is a block diagram of a communication system in accordance with the present invention.

FIG. 2 is an electrical block diagram of a terminal included in the communication system of FIG. 1 in accordance with the present invention.

FIGS. 7–9 are signal diagrams of signals transmitted by the terminal of FIG. 2 in accordance with the present invention.

DESCRIPTION OF A PREFERRED EMBODIMENT

Figure 3:
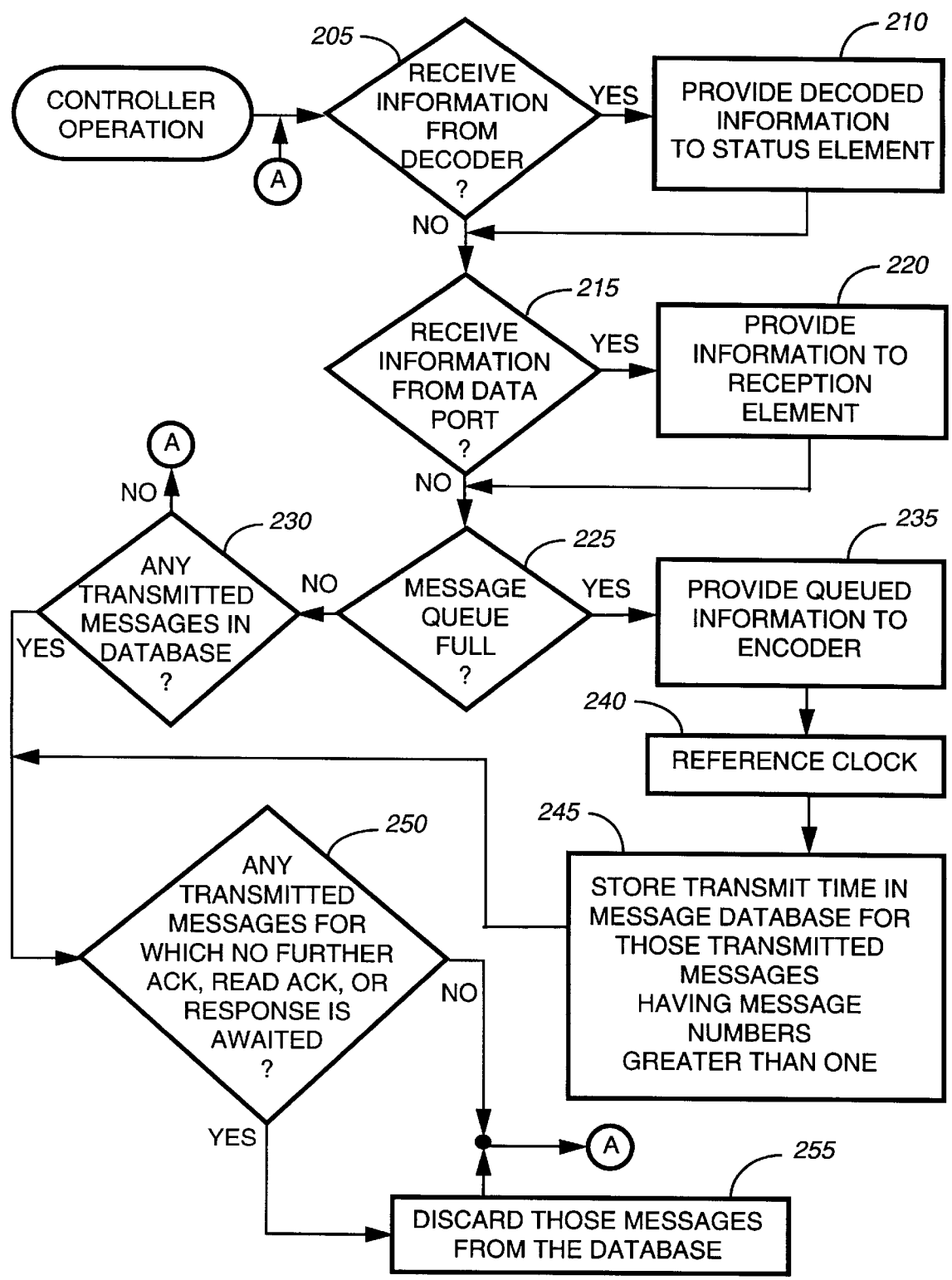
FIG. 3 is a flowchart of the operation of a controller included in the terminal of FIG. 2 in accordance with the present invention.

FIG. 1 shows a communication system 100 for transmitting messages between a message transmission device, such as a terminal 105, and transceivers 110, which are preferably portable and utilized by system subscribers to receive messages from the terminal 105. The communication system 100 can, for instance, comprise a paging system in which communication occurs via radio signals, although other types of communication systems, such as hardwired computer systems, are envisioned as well.

The terminal 105 preferably receives information from a conventional telephone 120 or other input device 125 over a telephone network 115 or from a data entry device (not shown) coupled directly to the terminal 105. Information received by the terminal 105 includes at least an identification of a targeted transceiver 110, such as by a transceiver address, and a message for the transceiver 110. The message is then transmitted as a radio signal to the transceiver 110, and the transceiver 110 acknowledges reception of the message by sending an acknowledgment (ACK) to the terminal 105.

Additionally, upon presentation of the message by the transceiver 110, a "read acknowledgment" (READ ACK) is transmitted to the terminal 105. If the message is one which invites a response, e.g., if the message asks a "yes" or "no" question, the transceiver 110 can also transmit the response by the user. According to the present invention, a message originator can also provide information to the terminal 105 indicating whether the terminal 105 is to transmit a reminder to the user of a transceiver 110 reminding him to read or respond to a message. In this manner, a user of a transceiver 110 can be, at the originator's request, reminded that certain messages should be read or that a response to a message is due.

FIG. 2 is an electrical block diagram of the terminal 105, which comprises a data port 180 for receiving information, such as the information from the message originator, from the telephone network 115 (FIG. 1) or another data entry device (not shown). The data port 180 provides the information to a controller 155 for controlling the operation of the terminal 105. The terminal 105 also comprises a clock 160 for generating time values and a message queue 185 for storing messages until transmission.

A first antenna 140 receives signals transmitted by the transceivers 110 (FIG. 1), and a receiver 145 demodulates and provides the signals to a decoder 150 for decoding data therefrom. The data is processed further by the controller 155. An encoder 165 is coupled to the controller 155 for encoding stored messages into a signalling protocol, such as Golay Sequential Code or the well known FLEX™ protocol. The encoded messages are modulated by a transmitter 170 and broadcast from a second antenna 175.

The terminal 105 further includes a message database 195 for storing messages destined for transceivers 110 and information relating to those messages. For each transmitted message, the message database 195 preferably stores a transmit time, a message number, information about whether an ACK, a READ ACK, or a response has been received for the message, and an address of the transceiver 110 to which the message was transmitted. Additionally, a read reminder setting is stored to indicate whether the message originator has specified that a read reminder should be sent when the transceiver 110 has not sent a READ ACK within a predetermined time. When the originator has specified that a response reminder is to be sent in the event that a response is not received in a timely manner, a time for the response reminder is stored in the message database 195 also.

A memory 190 is coupled to the controller 155 for storing firmware and subroutines executed by the controller 155 during operation of the terminal 105. Such firmware preferably includes a reception element 192 for processing data received from the transceivers 110, a status element 193 for determining the status of messages stored in the message database 195, and a reminder element 194 for generating reminders for transmission to the transceivers 110.

The memory 190 additionally includes message numbers, such as "0" and "1", respectively, for use with read and response reminders, a retransmit time, and a read reminder time. Although the read reminder time is preferably set in the memory 190, in alternate embodiments of the present invention, the read reminder time could be set for each message by the message originator, in which case the read reminder time for each message would probably be stored in the message database 195.

Referring next to FIG. 3, a flowchart depicts an operation of the controller 155 (FIG. 2) of the terminal 105. In accordance with the present invention, information is transmitted by a transceiver 110 and received by the terminal 105 via the antenna 140. At step 205, the controller 155 receives the information from the decoder 150 and, at step 210, provides the decoded information to the status element 193.

Information can also be received by the terminal 105 from message originators through the data port 180 (FIG. 2), at step 215. Information from the data port 180 is provided, at step 220, to the reception element 192.

During the operation of the terminal 105, the controller 155, at step 225, periodically checks the message queue 185 to determine whether it is full. When the message queue 185 is full, queued information is provided, at step 235, to the encoder 165 for transmission over the air to designated transceivers 110. Additionally, at steps 240, 245, the controller 155 references the clock 160 and stores the transmit times in the message database 195 for those transmitted messages having message numbers greater than one. In other words, transmit times for all messages other than read reminders and response reminders are stored.

It will be appreciated that the use of message numbers is only an example of a method that can be used to uniquely identify messages. Alternatively, other methods, such as the use of message check sums or parity information for identification purposes, could be utilized.

When the message queue 185 is not full, the controller 155 determines, at step 230, whether transmitted messages are stored in the message database 195. When at least one message is stored in the database 195, the controller 155, at step 250, further determines whether there are any stored messages for which no further ACK, READ ACK, or response is due. Any messages for which no further ACK, READ ACK, or response is due are discarded, at step 255.

Figure 4:
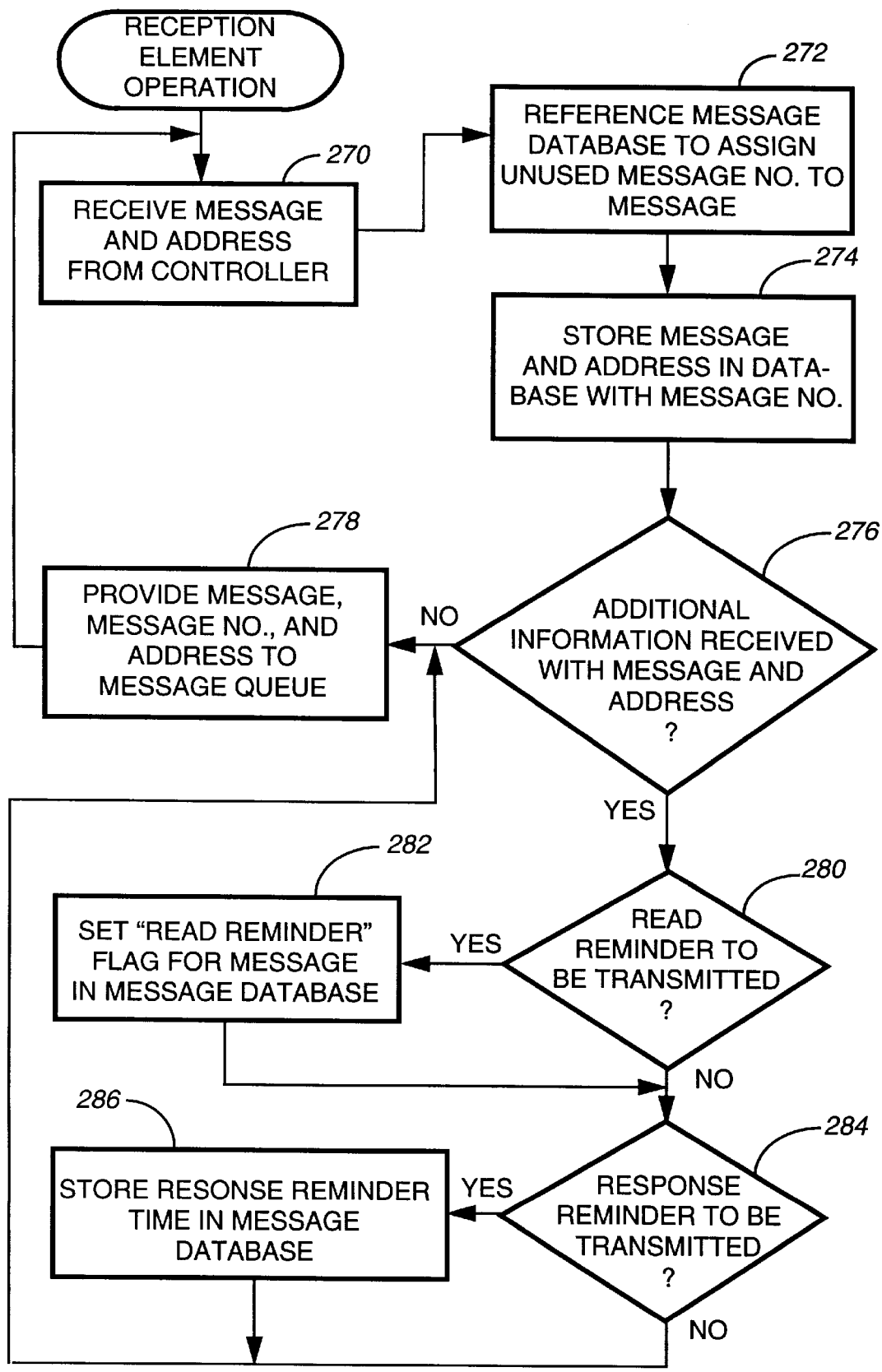
FIG. 4 is a flowchart of the operation of a reception element included in the terminal of FIG. 2 in accordance with the present invention.

FIG. 4 is a flowchart of the operation of the reception element 192 of the terminal 105. When, at step 270, the reception element 192 receives a message and an address from the controller 155, the message database 195 is referenced, at step 272, to assign an unused message number to the message. Preferably, the message numbers available to be assigned to received messages do not include message numbers reserved for use with read reminders and response reminders. The message and the address are then, at step 274, stored in the database 195 with the assigned message number. When, at step 276, no additional information is received with the message and address, the message, message number, and address are provided, at step 278, to the message queue 185. When additional information is received, the additional information can, in accordance with the present invention, include an indication, at step 280, that a read reminder is to be transmitted for the message if necessary. When a read reminder is to be transmitted, then a "read reminder" flag is set in the message database 195, at step 282. The additional information could also include an indication, at step 284, that a response reminder is to be transmitted if necessary. Preferably, the indication that a response reminder is to be transmitted is in the form of a time at which the message originator prefers the user of the transceiver 110 to be reminded. This time is stored, at step 286, in the message database 195. Alternatively, however, a response reminder could always be generated a predetermined time after transmission of the message, in which case the originator need not specify a time in the additional information.

Figure 5:
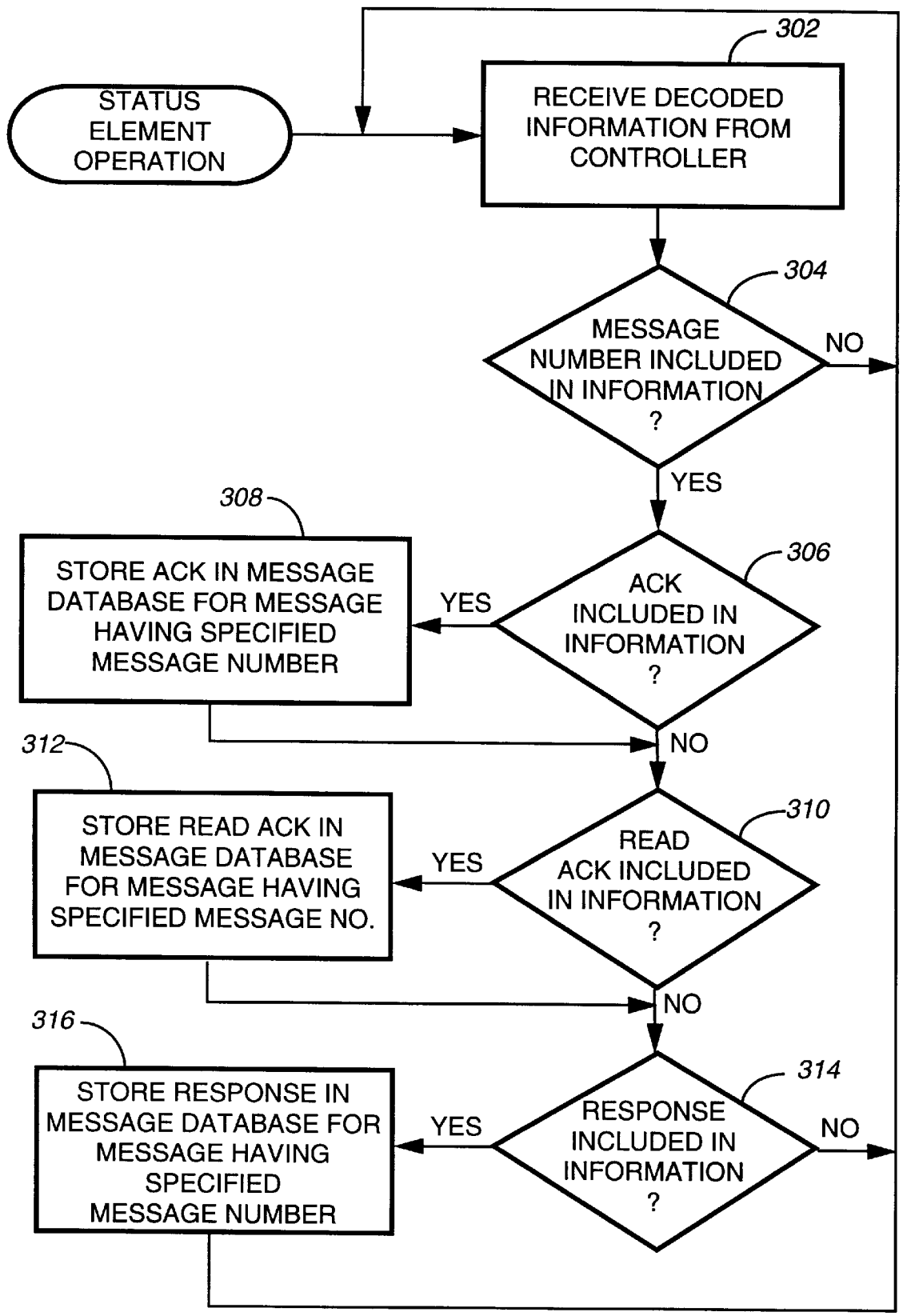
FIG. 5 is a flowchart depicting the operation of a status element included in the terminal of FIG. 2 in accordance with the present invention.

FIG. 5 is a flowchart showing the operation of the status element 193 included in the terminal 105, which receives decoded information from the controller 155 (FIG. 2), at step 302. When, at steps 304, 306, a message number and an ACK are included in the information, the ACK is stored, at step 308, in the message database 195 for the message having the specified message number. When, at steps 304, 310, a message number and a READ ACK are included in the information, the READ ACK is stored in the message database 195 for the message having that message number, at step 312. When, at step 314, a response, rather than an ACK or a READ ACK, is included in the information, the status element 193 stores, at step 316, the response in the message database 195 for the message having the message number included in the information.

Figure 6:
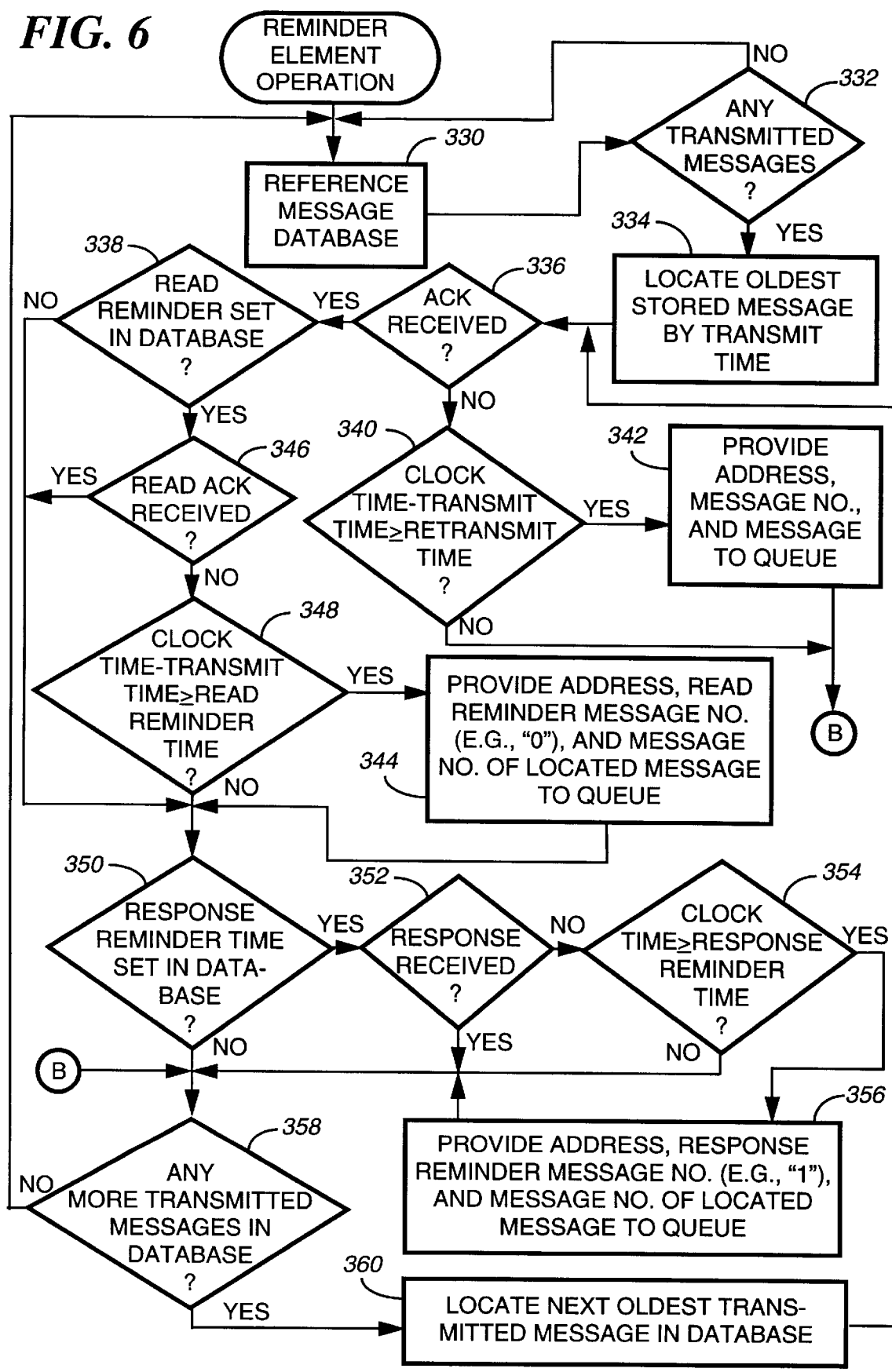
FIG. 6 is a flowchart of the operation of a reminder element included in the terminal of FIG. 2 in accordance with the present invention.

Referring next to FIG. 6, a flowchart of the reminder element operation is shown in accordance with the present invention. At steps 330, 332, the reminder element 194 references the database 195 (FIG. 2) and determines whether any transmitted messages are stored. The reminder element 194 then locates, at step 334, the oldest stored message based on the stored transmit times. When, at step 336, an ACK has not been received for the located message, the reminder element 194 determines, at step 340, whether the difference between the time indicated by the clock 160 and the stored transmit time is greater than or equal to the retransmit time stored in the memory 190, i.e., whether CLOCK TIME—TRANSMIT TIME≧RETRANSMIT TIME. When the difference in the times is greater than or equal to the retransmit time, the address, message number, and message are provided, at step 342, to the queue 185 to await retransmission to the transceiver 110 (FIG. 1).

After providing the information to the queue 185 or when the times do not indicate that the message should be retransmitted, the reminder element 194 determines, at step 358, whether any further transmitted messages are stored. When there are more messages in the message database 195, the next oldest message is located, at step 360, and processing continues at step 336.

When, at step 336, an ACK has been received for the located message and, at step 338, a read reminder has been set in the database 195, the reminder element 194 determines, at step 346, whether a READ ACK has been received. The READ ACK indicates that the message has been presented to the user of the transceiver 110. When a READ ACK has not been received, the reminder element 194 determines, at step 348, whether the difference between the clock time and the transmit time is greater than or equal to the read reminder time stored in the memory 190, i.e., whether CLOCK TIME—TRANSMIT TIME≧READ REMINDER TIME. When so, it is time for a read reminder to be sent to the transceiver 110 to remind the user thereof to read the message.

After determining that it is time for a read reminder to be transmitted, the reminder element 194 provides, at step 344, the transceiver address, the read reminder message number, e.g., "0", and the message number of the located message to the queue 185. This information is thereafter transmitted to the transceiver 110 to indicate that the transceiver 110 should display a reminder message associated with the located message.

Subsequently, the reminder element 194 determines, at step 350, whether a response reminder time has been stored in the message database 195 for the located message. If so, and if a response has not been received, at step 352, the reminder element 194 determines, at step 354, whether the clock time is equal to or greater than the stored response reminder time, i.e., whether CLOCK TIME≧RESPONSE REMINDER TIME. When the clock time is greater than or equal to the response reminder time, the reminder element 194 begins the process of generating a response reminder. At step 356, the reminder element 194 provides the transceiver address, the response reminder message number, e.g., "1", and the message number of the located message to the queue 185. This information is transmitted from the terminal 105 as a response reminder that reminds the transceiver user to respond to the previously transmitted message. Thereafter, when further messages are stored in the message database 195, the next oldest message is located, and processing continues at step 336.

Transmission of messages from the terminal 105 (FIG. 2) to the transceiver 110 may be more easily understood by referring to FIGS. 7–9. FIG. 7 is a signal diagram of a radio signal transmitted by the terminal 105. The signal preferably includes an address 380 of a targeted transceiver 110, a message number 385, and a message 390 associated with the message number 385. It will be understood, however, that methods of identifying transmitted messages other than by number can be alternatively utilized.

FIG. 8 is a signal diagram of the transmission of a read reminder to the transceiver 110. The signal still includes the address 380' of the recipient transceiver 110, a message number 385', and a message 390'. However, in accordance with the present invention, the message number 385' equals a predetermined number, such as "0", associated with read reminders. This predetermined message number is not assigned to any other types of messages by the terminal 105. The message 390' comprises a message number associated with the message for which the read reminder is sent. For instance, when message number "3" has been previously transmitted to a transceiver 110 having an address of "B", the contents of the message 390' can read "message number 3" or simply "3". Therefore, when the signal is received by the transceiver 110 having the address "B", the user of that transceiver 110 can be advantageously reminded to read message number "3".

FIG. 9 is a signal diagram of the transmission of a response reminder to the transceiver 110. The signal includes an address 380", a predetermined message number 385", e.g., "1", associated with response reminders, and a message 390". Preferably, the message 390" comprises the message number, e.g., "4", of the message for which the response reminder is being sent.

In accordance with the present invention, a message originator can provide the terminal 105 with not only a message, but also an indication of whether the message recipient should be reminded to read the message after a certain amount of time. In this manner, a message originator who sends an important message can alert the message recipient of the importance of reading the message. Additionally, when the message invites a response on the part of the recipient, the originator can provide the terminal 105 with a time at which the recipient should be reminded to respond to the message. As a result, situations are advantageously avoided in which the recipient reads the message, intends to respond, but forgets to do so. Furthermore, when the recipient responds to a message based upon a response reminder transmitted by the terminal 105, there is a relatively good chance that the response will actually reach the originator at that time, as the originator himself specified the response reminder time.

Figure 10:
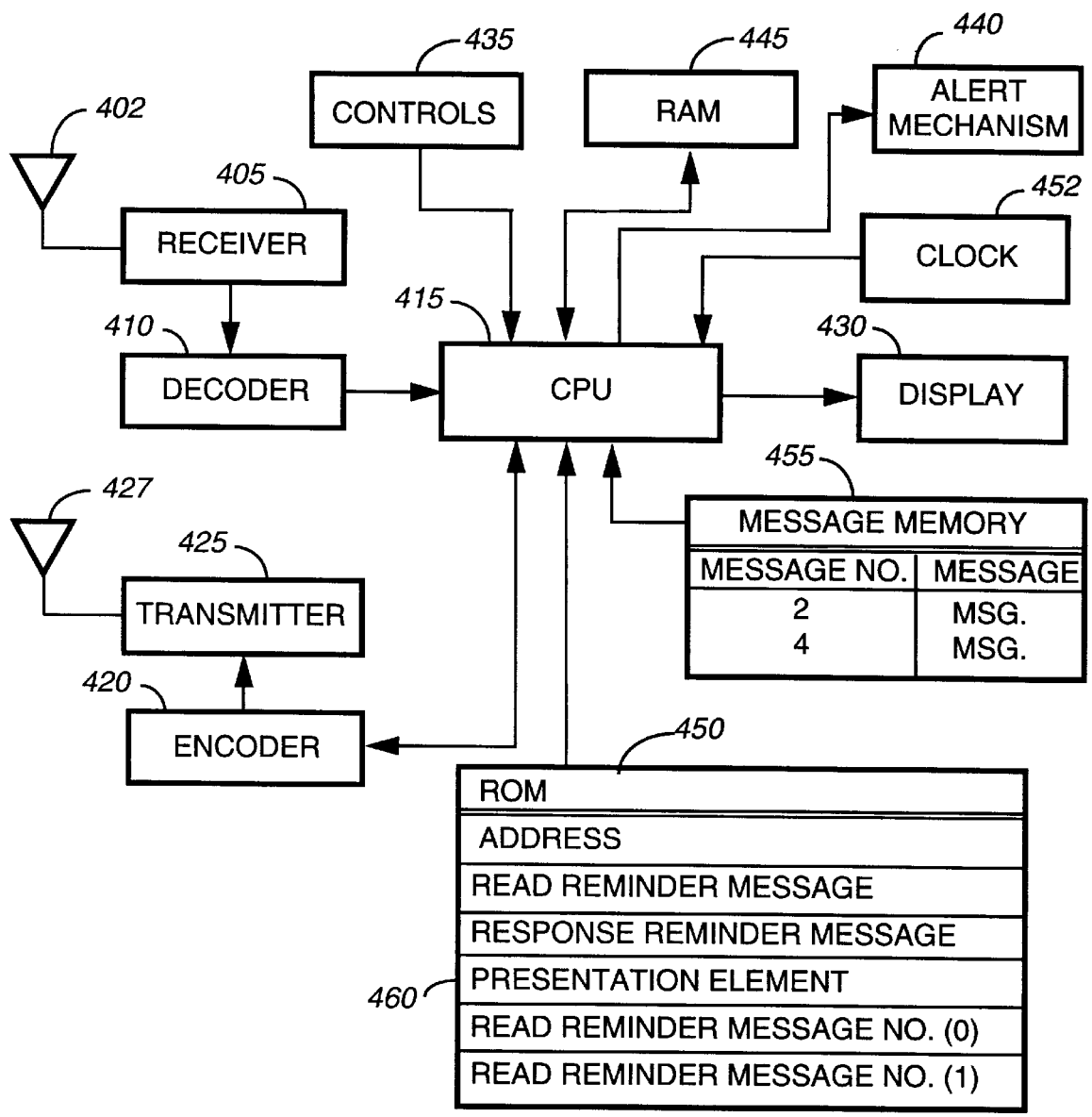
FIG. 10 is a transceiver included in the communication system of FIG. 1 in accordance with the present invention.

Referring next to FIG. 10, an electrical block diagram of a transceiver 110 is illustrated. The transceiver 110 includes a first antenna 402 for receiving a radio signal from the terminal 105 (FIG. 1) and a receiver 405 coupled thereto for demodulating the radio signal. A decoder 410 decodes the demodulated signal to recover information therefrom. The information is provided to a central processing unit (CPU) 415 for controlling the operation of the transceiver 110. The transceiver 110 further includes a random access memory (RAM) 445 for storing variables derived during operation of the transceiver 110, a clock 452 for generating time values, and an alert mechanism 440 for alerting the user to reception of a message. A display 430 is coupled to the CPU 415 for presenting information to the user, and controls 435 are coupled to the CPU 415 for providing user inputs to the CPU 415.

The transceiver 110 also comprises an encoder 420 for encoding data into a signalling format such as Golay Sequential Code or FLEX™ and a transmitter 425 for modulating the encoded data. A second antenna 427 coupled to the transmitter 425 broadcasts the modulated data over the air.

A reception database 455 included in the transceiver 110 stores messages received by the transceiver 110 and the message number for each received message. As mentioned above, the message number for each message is transmitted by the terminal 105. Additionally, a memory 450 is included in the transceiver 110 for storing firmware and subroutines executed by the CPU 415 during operation of the transceiver 110. The memory 450 preferably stores the address of the transceiver 110, the message numbers for read and response reminders, and predetermined messages associated with the read and response reminders. A presentation element 460 is also stored in the memory 450 for presenting read and response reminders to the user via the display 430.

Figure 11:
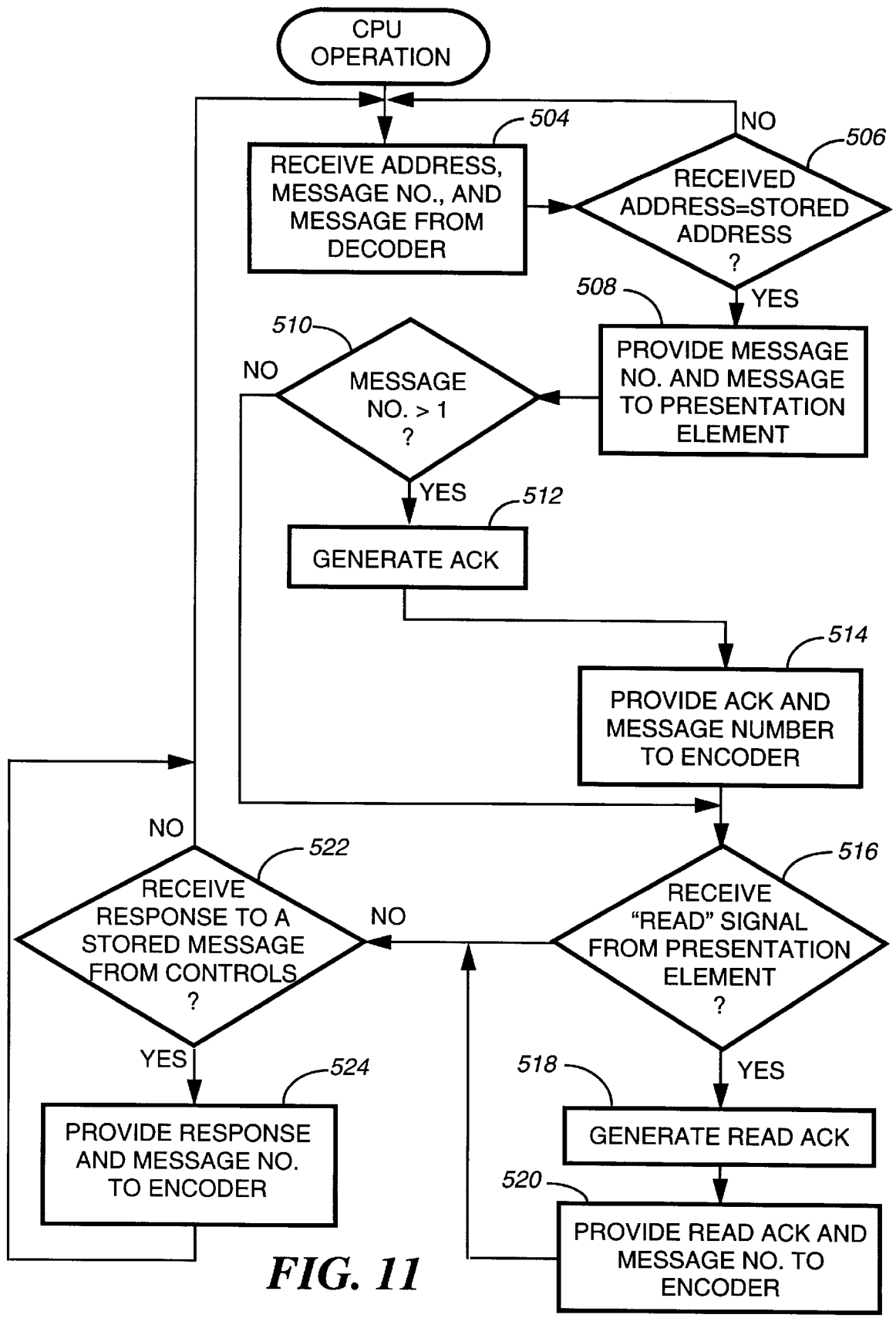
FIG. 11 is a flowchart depicting the operation of a central processing unit included in the transceiver of FIG. 10 in accordance with the present invention.

FIG. 11 is a flowchart of an operation of the CPU 415 in accordance with the present invention. At step 504, the CPU 415 receives an address, a message number, and a message from the decoder 410. When, at step 506, the received address is equivalent to the stored transceiver address, the message number and the message are provided, at step 508, to the presentation element 460 (FIG. 10). When, at step 510, the message number is greater than the predetermined numbers reserved for read and response reminders, e.g., when the message number is greater than "1", the CPU 415 generates, at step 512, an ACK. The ACK is preferably a first predetermined data pattern that indicates to the terminal 105 that a message has been received by the transceiver 110. The ACK and the message number of the received message are then provided, at step 514, to the encoder 420 for transmission to the terminal 105.

When, at step 516, the CPU 415 receives from the presentation element 460 a "read" signal, which indicates that a message of a particular message number has been presented, the CPU 415 generates a READ ACK, at step 518. The READ ACK preferably comprises a second predetermined data pattern that is recognized as a READ ACK by the terminal 105. The READ ACK and the message number of the presented message are provided, at step 520, to the encoder 420 for transmission to the terminal 105.

When, at step 522, the CPU 415 receives a response to a message from the controls 435 (FIG. 10), the response and the message number associated with the response are provided, at step 524, to the encoder 420. The response and the message number are thereafter transmitted to the terminal 105 so that the response can be forwarded to the message originator.

Figure 12:
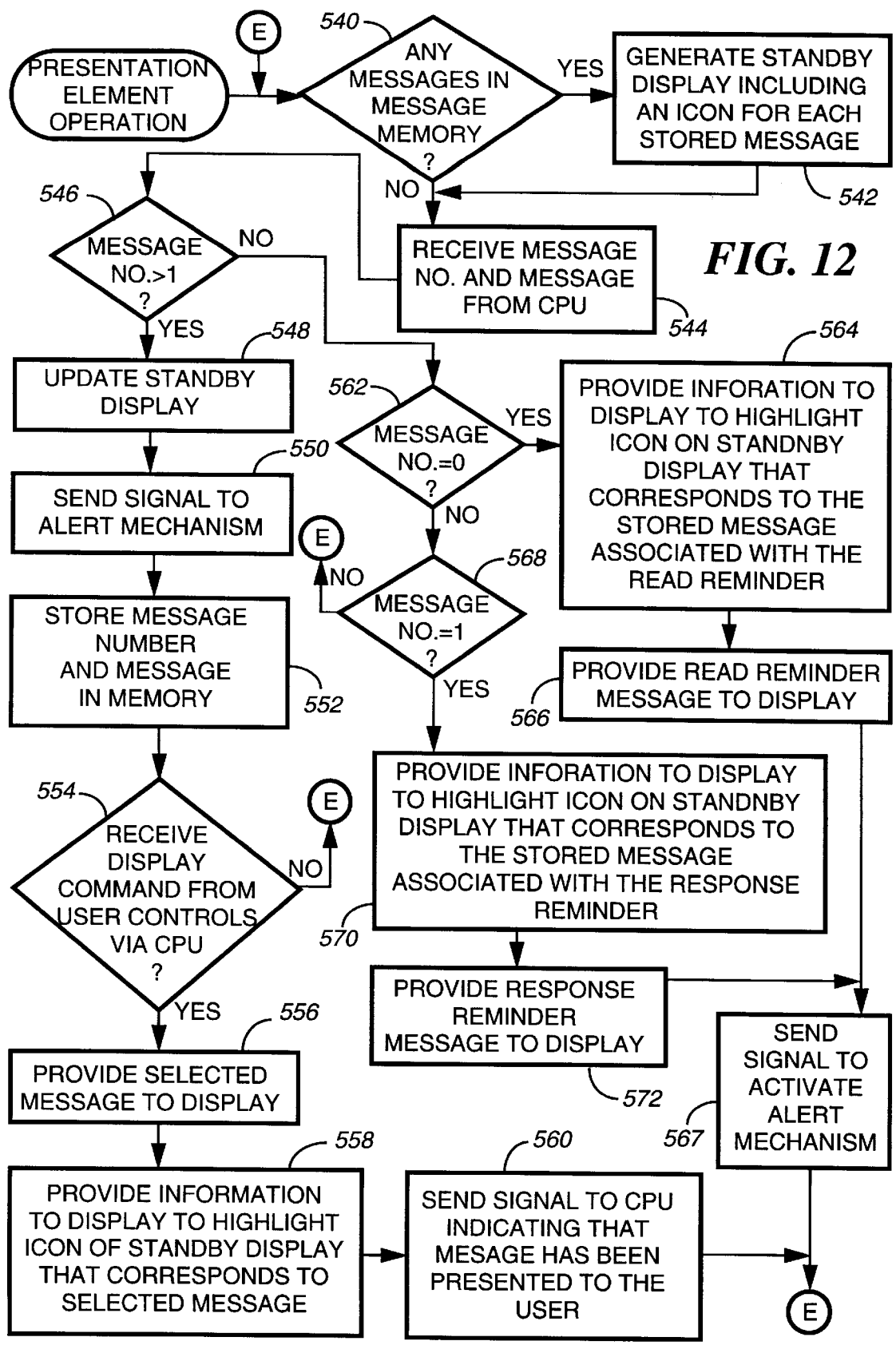
FIG. 12 is a flowchart depicting the operation of a presentation element included in the transceiver of FIG. 10 in accordance with the present invention.

FIG. 12 is a flowchart depicting the operation of the presentation element 460 included in the transceiver 110. When, at step 540, messages are stored in the reception database 455 (FIG. 10), the presentation element 460 generates, at step 542, a standby display that includes an icon for each stored message. In this manner, the user can conveniently read the display 430 and determine how many messages are stored by the transceiver 110. When, at step 544, a message number and a message are received from the CPU 415, the presentation element 460 determines, at step 546, whether the message number is greater than the predetermined numbers reserved for use by read and response reminders. For instance, message numbers "0" and "1" can be reserved for read and response reminders, respectively, in which case the presentation element 460 determines, at step 546, whether the message number is greater than one.

When the message number is greater than one, the presentation element 460 updates, at step 548, the standby display and sends, at step 550, a signal to the alert mechanism 440 (FIG. 1). In response to this signal, the alert mechanism 440 provides an alert, such as a tone, to inform the user that a message has been received. The message number and message are then stored, at step 552, in the reception database 455.

When, at step 554, a "display" command is received from the user controls 435, indicating that a particular message is to be presented, the message selected for presentation is provided, at step 556, to the display 430. Additionally, the presentation element 460 provides, at step 558, information to the display 430 to highlight the icon of the standby display that is associated with the selected message. Therefore, the user can see which of the stored messages is currently being presented. At step 560, the presentation element 460 thereafter sends a signal, i.e., a "read" signal, to the CPU 415 indicating that the message has been presented.

At step 562, when the message number is equivalent to the predetermined read reminder message number, e.g., "0", information is provided, at step 564, to the display 430 to highlight the icon of the standby display that corresponds to the message for which the read reminder has been received. In other words, if a read reminder has been received for message number "3", the third icon on the standby display will be highlighted for viewing by the user. Additionally, the presentation element 460 provides, at step 566, the predetermined read reminder message to the display 430 and activates, at step 567, the alert mechanism 440.

When, at step 568, the message number is equivalent to the response reminder message number, e.g., "1", information is provided, at step 570, to the display 430 to highlight the icon of the standby display that is associated with the message for which the response reminder has been received. The presentation element 460, at steps 572, 567, provides the predetermined response reminder message to the display 430 and activates the alert mechanism 440.

Figure 13:
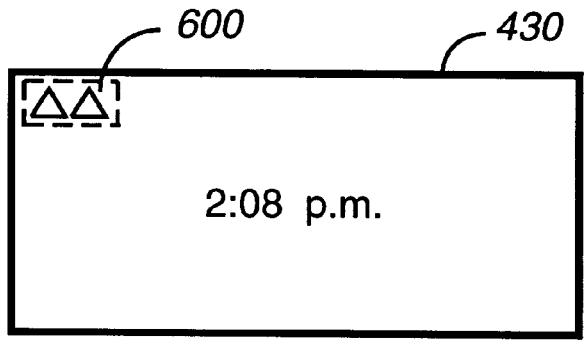
FIGS. 13–16 are illustrations of displays of information by the transceiver of FIG. 10 in accordance with the present invention.
Figure 14:
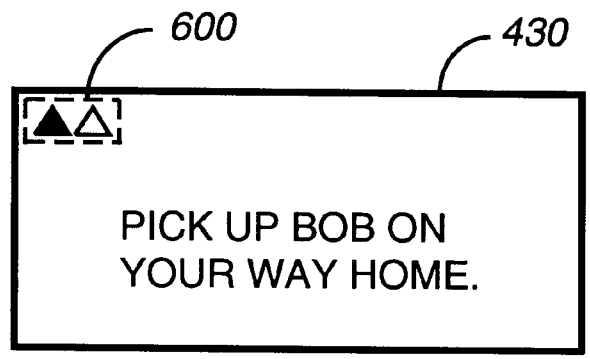

Referring next to FIGS. 13–16, illustrations depict the presentation of information on the display 430 in accordance with the present invention. FIG. 13 shows the use of the standby display 600, which includes two icons. This indicates to the user that two messages have been received and are currently stored in the reception database 455 (FIG. 10). FIG. 14 illustrates the presentation of a first of the stored messages. The standby display 600 has been updated to highlight the first icon, which corresponds to the displayed message.

Figure 15:
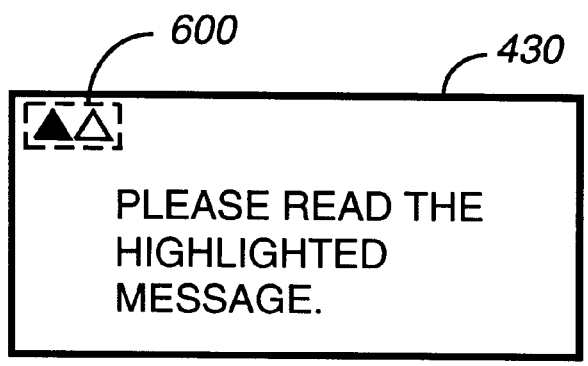
Figure 16:
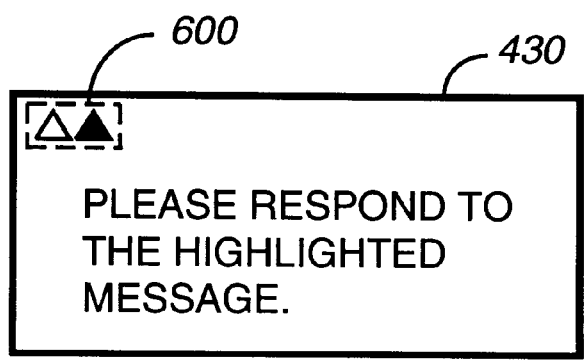

In FIG. 15, the predetermined read reminder message is presented to the user in response to reception of a read reminder by the transceiver 110. Additionally, the first icon has been highlighted in the standby display 600 to indicate that the displayed read reminder message refers to the message associated with the first icon. FIG. 16 illustrates an example of a predetermined response reminder message, which reminds the user to respond to an indicated message. The standby display 600 of FIG. 16 includes an icon that has been highlighted to show the user which message is awaiting a response.

In summary, the communication system described above includes a terminal for transmitting messages to a system subscriber from a message originator. The system subscriber receives messages through use of a transceiver, which is preferably portable. In response to reception of a message, the transceiver transmits an acknowledgment to the terminal to inform the terminal that the message has been received. When an acknowledgment for a transmitted message has not been received within a predetermined time, the terminal retransmits the message to the transceiver.

In response to presentation of the message to the subscriber, i.e., the message recipient, the transceiver generates and transmits a "read" acknowledgment to the terminal indicating that the message has been read. The read acknowledgment can then be forwarded to the originator to inform him of the message status.

When the message invites a response on the part of the recipient, the recipient enters data indicative of a response into the transceiver. This can be done, for example, through use of transceiver controls or a transceiver data port to which information can be transmitted by another device, such as a computer. The response is then transmitted to the terminal for forwarding to the message originator.

The message originator can also provide the terminal with an indication that the recipient is to be reminded to read a particular message when a predetermined time has passed without the transceiver sending a read acknowledgment. After the predetermined time has passed, the terminal checks to see whether a read acknowledgment has been received. When it has not, the terminal generates a read reminder that is transmitted to the transceiver. This read reminder triggers presentation of a predetermined read reminder message to remind the recipient that the designated message is still unread.

The originator can further provide the terminal with a "response reminder" time at which the recipient is to be reminded to respond to a particular message. When a response has not been received by the response reminder time provided by the originator, the terminal generates and transmits a response reminder. When received by the transceiver, the response reminder causes the presentation of a predetermined response reminder message that reminds the recipient to respond to a previously received message.

In this manner, the message recipient is conveniently reminded to read important messages. The originator can therefore be assured that the recipient has either read a particular message or has been reminded to do so without further action on the part of the originator. Additionally, the recipient can be reminded to respond to a message without the originator having to track down the recipient through other means, such as by calling him or sending electronic mail. As a result, situations are avoided in which the originator is left wondering whether he should contact the recipient to receive a response or in which the recipient simply forgets to read or respond to a stored message.

It will be appreciated by now that there has been provided a method and apparatus for reminding a message recipient to read and respond to previously transmitted messages.

What is claimed is:

1. A method for transmitting reminders in a communication system including a terminal that receives messages to be transmitted to a transceiver, the method comprising, in the terminal, the steps of:

transmitting a message to the transceiver;

determining that an acknowledgment relating to the message has not been received from the transceiver after a predetermined time, the acknowledgment indicating that the message has been presented by the transceiver; and sending, responsive to said determining step, a read reminder to the transceiver to remind a user thereof to read the message.

2. The method of claim 1, wherein:

the transmitting step comprises the step of transmitting the message and a message number associated with the message to the transceiver; and the sending step comprises the step of sending the read reminder and the message number to the transceiver.

3. The method of claim 1, wherein the determining step comprises the step of referencing a database, where an indication of the acknowledgment would be stored, to determine that no indication of the acknowledgment is stored after the predetermined time.

4. The method of claim 3, wherein the sending step comprises the step of sending the read reminder and a message number associated with the message previously transmitted to the transceiver.

5. The method of claim 3, further comprising, in the transceiver, the steps of:

receiving the read reminder and the message number; and displaying, in response to receiving the read reminder, a predetermined read reminder message to remind the user to read the message associated with the message number.

6. A terminal for transmitting reminder messages, the terminal comprising:

a transmitter for transmitting a message to a transceiver;

a receiver for receiving an acknowledgment relating to the message from the transceiver, the acknowledgment indicating that the message has been presented to a user;

a reminder element coupled to the transmitter and the receiver for generating, when the acknowledgment, indicating the message has been presented, has not been received, a read reminder to remind the user to read the message; and a data port for receiving the message for transmission to the transceiver and for receiving an indication that the read reminder is to be transmitted to the transceiver in response to determining that the acknowledgment has not been received from the transceiver after the predetermined time.

7. The terminal of claim 6, further comprising a clock for generating time values.

8. The terminal of claim 6, further comprising a message database for storing the message, the indication that the read reminder is to be transmitted, and the acknowledgment, when the acknowledgment has been received.

9. The terminal of claim 8, further comprising a memory for storing the reminder element.

10. The terminal of claim 8, further comprising:

a reception element for storing the acknowledgment in the message database when the acknowledgment has been received.

11. A communication system in which reminders are transmitted, the communication system comprising:

a transceiver for receiving and presenting a message to a user, the transceiver comprising a transmitter for transmitting an acknowledgment when the message has been presented; and a terminal for transmitting the message, the terminal comprising a reminder element for sending a read reminder to the transceiver when the acknowledgment, indicating the message has been presented, has not been received after a predetermined time;

wherein the transceiver further comprises a display for presenting a predetermined read reminder message responsive to the read reminder to remind the user to read the message.

12. The communication system of claim 11, wherein the terminal further comprises a database for storing the message and, when received, the acknowledgment.

13. The communication system of claim 11, wherein the terminal further comprises a data port for receiving the message and for receiving an indication that the read reminder should be transmitted after the predetermined time.

14. A communication system in which reminders are transmitted, the communication system comprising:

a transceiver for receiving and presenting a message to a user, the transceiver comprising means inputting a response to the message by the user and a transmitter for transmitting the response when the response has been received from the inputting means; and a terminal for transmitting the message, the terminal comprising a reminder element for sending a response reminder to the transceiver when the response, indicating the message has been presented, has not been received after a predetermined time;

wherein the transceiver further comprises a display for presenting a predetermined response reminder message responsive to reception of the response reminder to remind the user to respond to the message.

15. The communication system of claim 14, wherein the terminal further comprises a database for storing the message and, when received, the response.

16. The communication system of claim 14, wherein the terminal further comprises a data port for receiving the message and for receiving an indication that the response reminder should be transmitted after the predetermined time.

17. A method for transmitting reminders in a communication system including a terminal that receives messages to be transmitted to a transceiver, the method comprising the steps of:

the terminal transmitting a message and a message number associated with the message to the transceiver;

the terminal determining that a response to the message has not been received from the transceiver after a predetermined time by referencing a database where an indication of the response would be stored and determining that no indication of the response is stored after the predetermined time;

the terminal sending, after the predetermined time, a message number of the message and a response reminder to the transceiver to remind the user thereof to respond to the message:

the transceiver receiving the response reminder and the message number; and the transceiver displaying a predetermined response reminder message associated with the response reminder to remind the user to respond to the message associated with the message number.

* * * * *